United States Patent [19]

Poehlmann

[11] 4,023,846
[45] May 17, 1977

[54] BROKEN-BOLT RELEASE MECHANISM

[75] Inventor: Paul W. Poehlmann, Stinson Beach, Calif.

[73] Assignee: H. Koch & Sons, Inc., Anaheim, Calif.

[22] Filed: June 24, 1974

[21] Appl. No.: 482,354

[52] U.S. Cl. .................... 294/83 AE; 24/230 R; 24/230 AN; 244/151 B
[51] Int. Cl.$^2$ .................. A44B 19/00; B64D 17/38
[58] Field of Search ......... 294/83 R, 83 A, 83 AE; 244/137 R, 151 R, 151 A, 151 B, 121, 122 AE, 122 AF, 107; 24/205.17, 230 R, 230 AL, 230 AN, 265 B, 201 LP, 73 PH; 16/168, 178; 89/1.5 R, 1.5 F; 403/157, 324, 379

[56] References Cited

UNITED STATES PATENTS

| | | | |
|---|---|---|---|
| 2,650,127 | 8/1953 | Carlson | 294/83 AE |
| 2,709,961 | 6/1955 | Klas | 244/151 A X |
| 2,715,872 | 8/1955 | Klas | 294/83 AE |
| 2,992,467 | 7/1961 | Gaylord | 24/230 AN |
| 3,094,928 | 6/1963 | Costley | 294/83 AE X |
| 3,624,813 | 11/1971 | Gaylord | 294/83 AE |
| 3,632,066 | 1/1972 | Brown et al. | 24/73 PH X |
| 3,744,102 | 7/1973 | Gaylord | 244/151 A X |
| 3,774,870 | 11/1973 | Sheffield et al. | 244/151 B X |
| 3,845,525 | 11/1974 | Gaylord | 24/265 B X |
| 3,865,333 | 2/1975 | Fielding et al. | 24/230 AN X |
| 3,872,556 | 3/1975 | Frost | 244/151 B |

FOREIGN PATENTS OR APPLICATIONS 803,518  10/1936  France .............. 24/265 B Primary Examiner—Johnny D. Cherry
Assistant Examiner—James L. Rowland
Attorney, Agent, or Firm—George B. White

[57] ABSTRACT

A release mechanism adapted for coupling parachute canopy riser straps to parachute harnesses is described wherein the male and female members of the mechanism are held together by two axially aligned bolt elements (a broken bolt) disposed in a common coupling passageway defined through the male and female members. An integral electronic water-activated energizing mechanism drives the two element broken-bolt longitudinally in the coupling passageway allowing the male and female members of the mechanism to separate whereby one of the bolt elements stays with the female member and the other bolt element stays with the male member. The described release mechanism further includes protective cover means for isolating sensing electrodes of the electronic water-activated energizing mechanism from the external environment prior to deployment of the parachute canopy.

16 Claims, 7 Drawing Figures

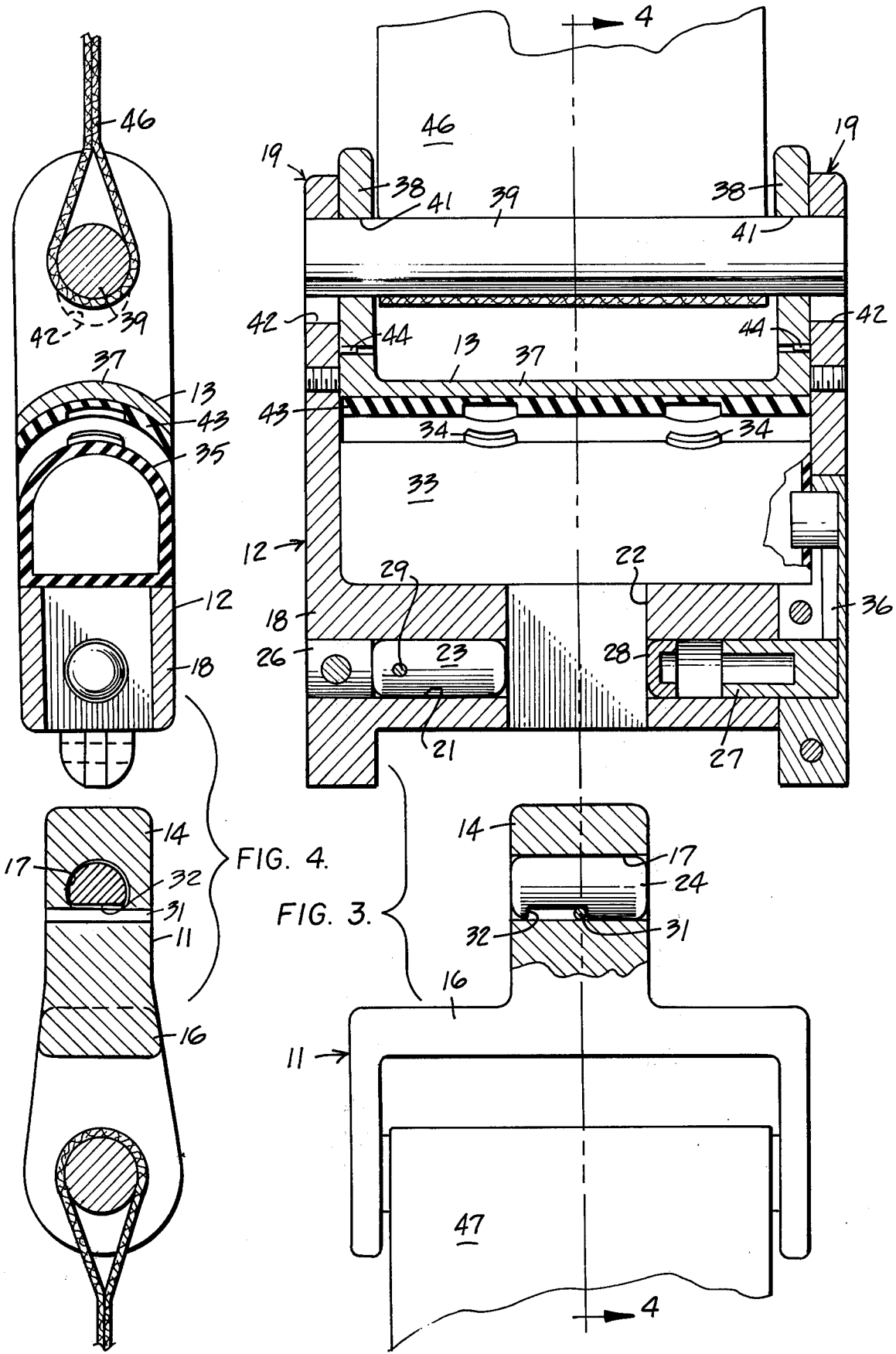

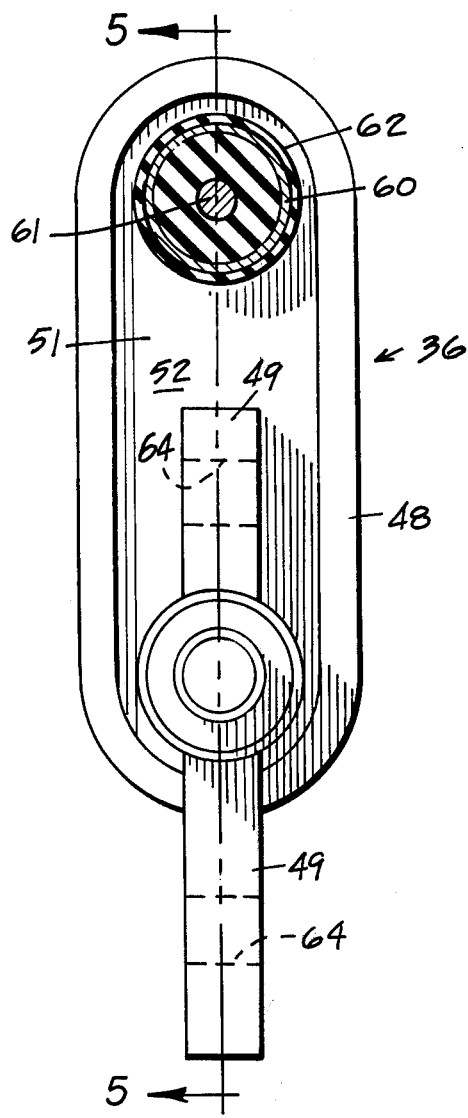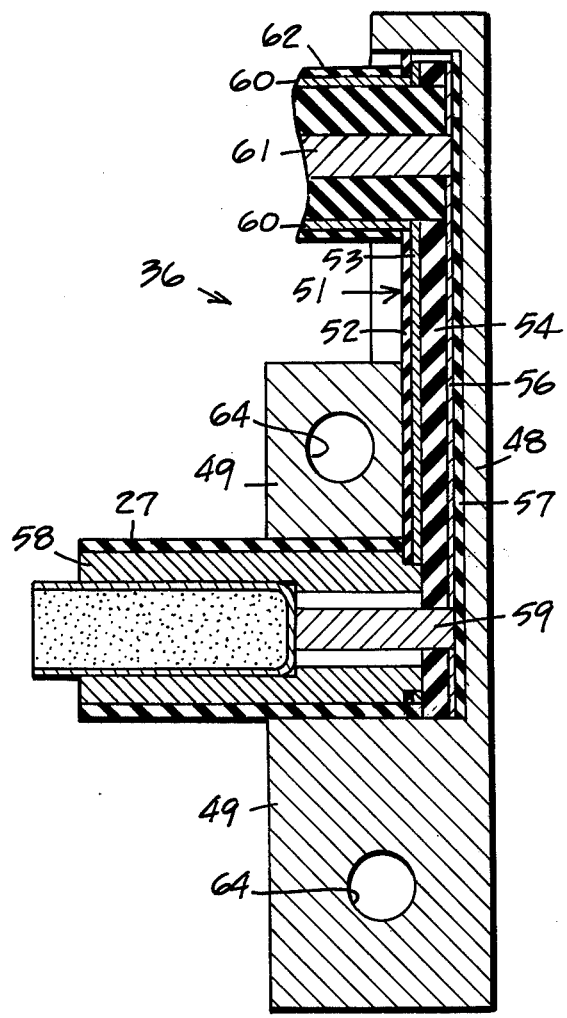

BROKEN-BOLT RELEASE MECHANISM

CROSS REFERENCE TO RELATED PATENT APPLICATIONS

The integral electronic water-activated energizing means includes circuitry described in patent application Ser. No. 467,298, now Pat. No. 3,910,457 entitled "An Electronic Water-Activated Parachute Release and Life Vest Inflator", invented by Roderick W. Sutliff and David E. Edwards and assigned to H. Koch and Sons, Inc., a division of Global Systems, a Gulf and Western Company, Corte Madera, Calif., the assignee of this application.

BACKGROUND OF THE INVENTION

1. Field of the Invention

The invention relates generally to a release mechanism or coupling, and particularly to a release mechanism or coupling for automatically releasing parachute canopy riser straps from a parachute harness upon immersion in water. Other features of the invented release mechanism relate to a protective cover means for isolating sensing electrodes of an integral water-sensing electronic circuit from the external environment prior to deployment of the parachute canopy.

2. Description of the Prior Art

Objects are often parachuted from aircraft over large bodies of water. In addition, airmen are sometimes required to eject from a disabled aircraft over water and parachute to safety. Upon reaching the water, it is essential that the parachute canopy be separated from the object or airman. Specifically, strong winds, air currents and/or water currents can fill the parachute canopy and drag the object or pilot for substantial distances through the water, thereby increasing the difficulty of locating and picking up the object or rescuing the pilot. Also, where there are no surface winds or water currents, the parachute canopy may settle around the dropped object or pilot, and hamper recovery of the object or pilot. The canopy also hampers survival efforts of a pilot in the water.

Many different types of mechanisms are described in the prior art which automatically release parachute canopy riser straps from a parachute harness upon the object parachuted reaching the earth's surface.

For example, U.S. Pat. No. 3,306,653 issued to John A. Gaylord, describes a mechanical mechanism for releasing parachute canopy riser straps responsive to the decreased load on the mechanism when the object carried by the parachute strikes the ground or other surface. U.S. Pat. No. 3,624,674, also issued to John A. Gaylord, describes a webbing strap connector wherein an explosive squib, detonated by an external electrical circuit, energizes a mechanical release mechanism allowing the male and female members of the connector to separate. U.S. Pat. No. 3,624,813, again issued to John A. Gaylord, describes a break-away strap release for use on parachute harnesses, which is energized by an electrical explosive device detonated by an external electrical circuit.

In addition, there are many parachute strap release mechanisms described in the prior art which operate responsive to gas pressure from a remote source. (See U.S. Pats. Nos. 3,658,281; 3,744,102; 3,744,103; 3,767,143; and 3,766,611; all issued to John A. Gaylord.)

Finally, co-pending patent application, Ser. No. 467,298, entitled "An Electronic Water-Activated Parachute Release and Life Vest Inflator", assigned to the same assignee herein, describes a break-away webbing frame release mechanism adapted for automatic release upon immersion in water.

An analysis of prior art shows the preferred design objectives for an automatic parachute canopy release relate to (1) decreasing the probability of premature operation; (2) increasing structural resistance to mechanical shock and disfiguration; (3) decreasing the decoupling time; (4) decreasing energy required for disengagement; and (5) positive disengagement upon operation.

SUMMARY OF THE INVENTION

A release coupling is described wherein the male and female members of the coupling define a common locking passageway oriented transversely through their engaged portions. A two element bolt (broken-bolt) is disposed in the locking passageway and adapted to move from a locking position to a releasing position. In the locking position, the broken-bolt secures the engaged portions of the male and female members together. In the releasing position, the male and female members separate, with one element of the bolt staying with the female member and the other element of the bolt staying with the male member.

A particular embodiment of the release coupling adapted for releasing a parachute canopy from the object it supports includes means for automatically driving the broken-bolt from the locking position to the releasing position responsive to immersion in water, and a protective cover means for isolating water-sensing electrodes from the external environment prior to deployment of the parachute canopy.

The invented release coupling is particularly adapted for automatically releasing a parachute canopy from the object it supports upon the object reaching the earth's surface in that it (1) has a very low probability of premature operation; (2) has a very high structural resistance to mechanical shock and disfiguration; (3) has a short decoupling time; (4) requires very little energy for disengagement; and (5) positively disengages upon operation.

DESCRIPTION OF THE FIGURES

FIG. 3 is a cross-sectional view of the release coupling in a disengaged position.

FIG. 4 is a cross-sectional view of the release coupling taken along line 4—4 of FIG. 3.

FIG. 5 is a detailed cross-sectional view of the circle section 5—5 of FIG. 1.

FIG. 6 is a top view of FIG. 5.

DESCRIPTION OF A PREFERRED EMBODIMENT

Figures 1, 2:
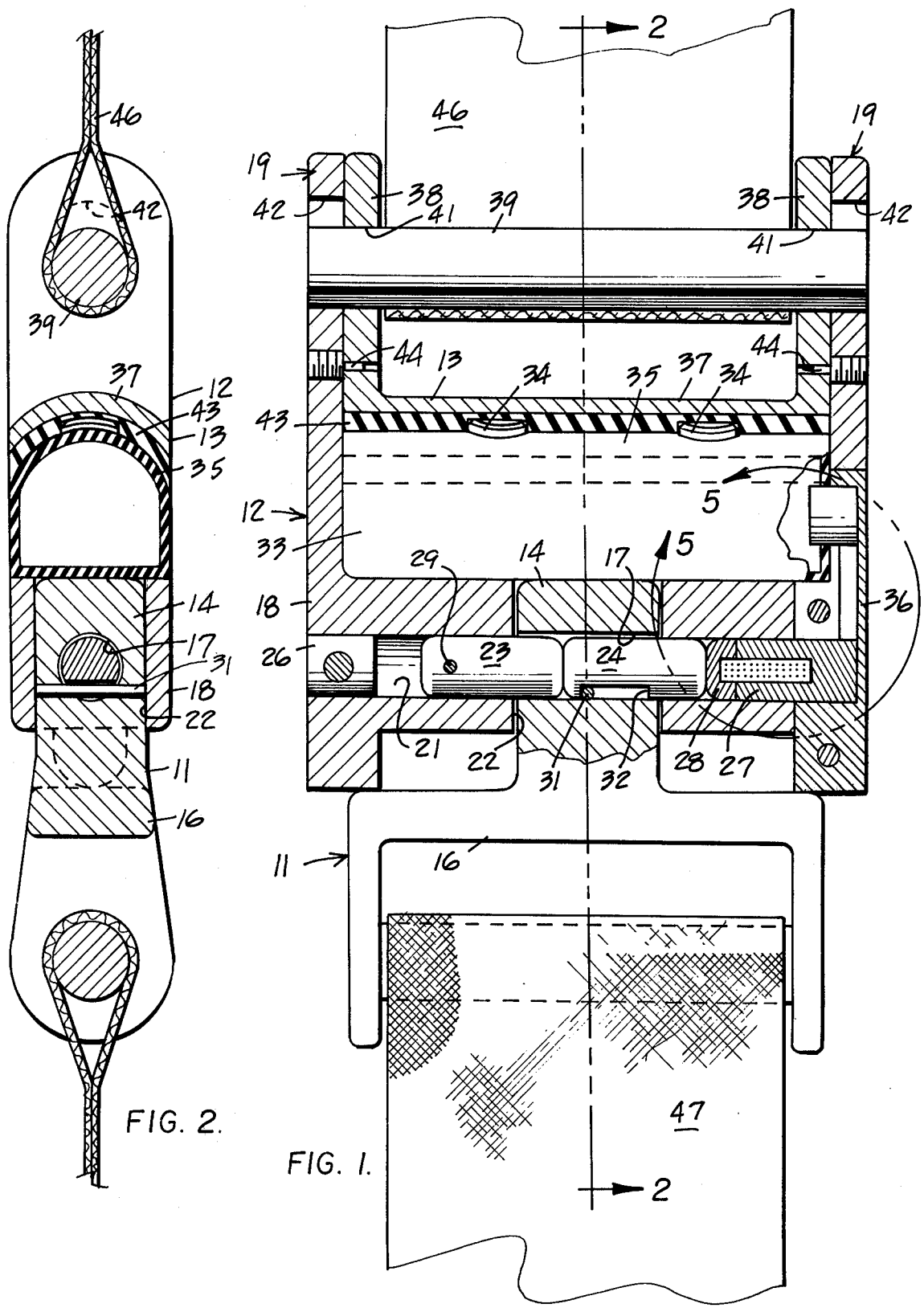
FIG. 1 is a cross-sectional view of the broken-bolt release coupling in an engaged position.
FIG. 2 is a cross-sectional view of the release coupling taken along line 2—2 of FIG. 1.
Figure 7:
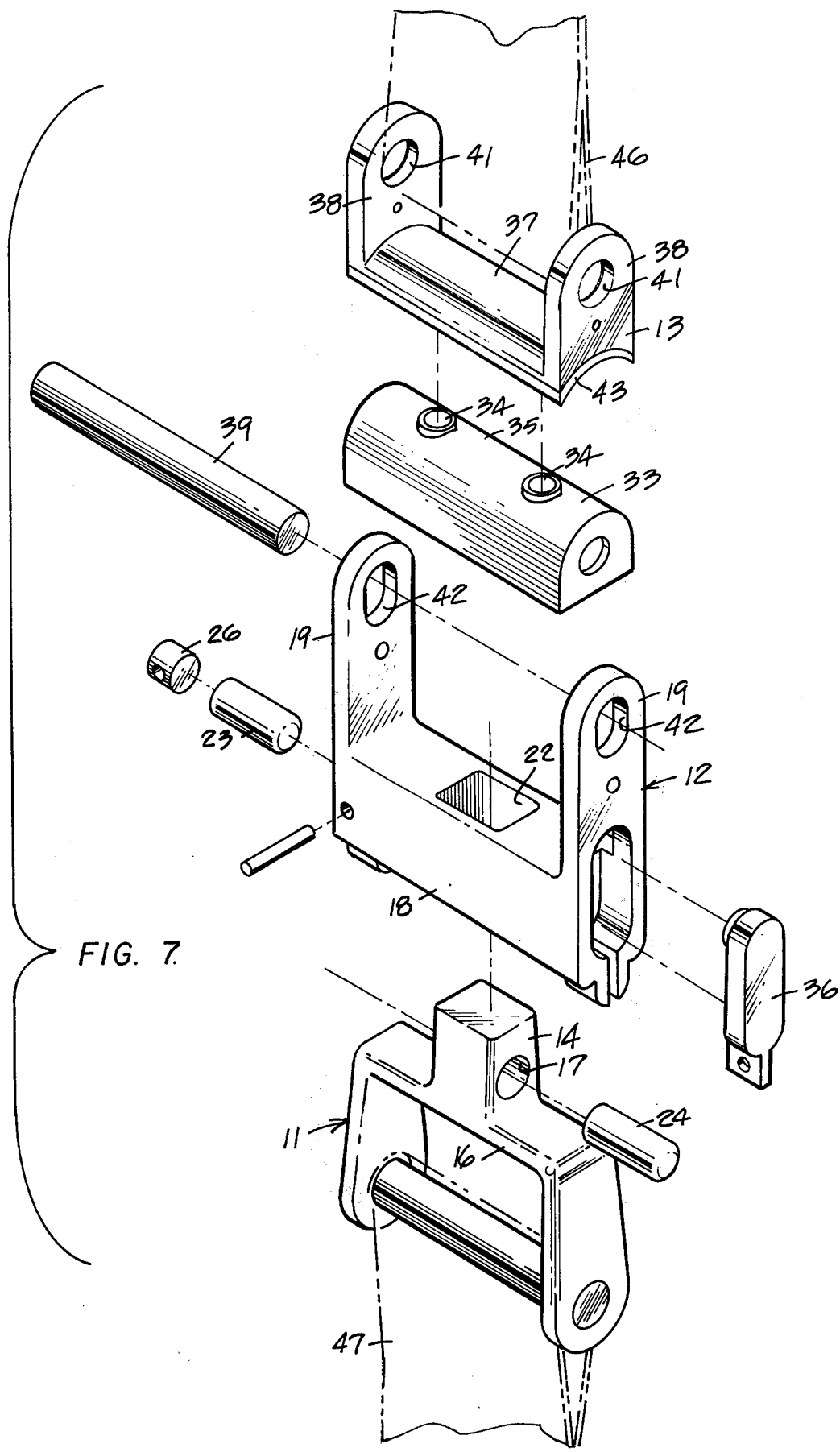
FIG. 7 is an exploded view of the broken-bolt release coupling.

Referring now to FIG. 1, the invented release coupling includes a male member 11, a female member 12 and a protective cap element 13.

The male member 11 includes a tongue element 14 integral with a conventional webbing frame 16. The tongue element 14 has a passageway 17 perpendicular to its longitudinal axis.

The female member 12 is basically a rigid structural frame with a connecting bar 18 and two extending legs 19. The connecting bar 18 of the female member 12 has a passageway 21 which intersects a receptacle 22 adapted to receive the tongue element 14 of the male member 11.

As shown in FIG. 1, when the tongue element 14 of the male member 11 is inserted into the receptacle 22 of the female member 12, the passageway 17 through the tongue element 14 is in registry with the passageway 21 through the connecting bar 18 of the female member 12. (The common passageway formed by the registering passageways 17 and 21 hereinafter is referred to as the "locking passageway"). Per the perspective of FIG. 1, a stop 26 is disposed in the left end of the "locking passageway" and an explosive squib cartridge 27 is disposed in the right end of the "locking passageway".

Two bolt elements 23 and 24 are disposed within the "locking passageway" for coupling the tongue element 14 of the male member 11 to the connecting bar element 18 when the tongue element is inserted into the receptacle 22. The bolt element 23 extends from the portion of the locking passageway left of the receptacle into the tongue passageway 17. The bolt element 24 extends from the tongue passageway 17 into the portion of the "locking passageway" right of the receptacle 22.

A piston element 28 of the explosive squib cartridge 27 abuts against the right end of the bolt element 24 when the coupling is connected. A shear pin 29, received in a hole through the bar element 18 and through the bolt element 23, holds the release coupling in a "normally connected" position. A keeper pin 31 received in a hole through the tongue element 14 and a relief 32 on one side of the bolt element 24 keeps the bolt element 24 with the tongue element 14. The relief 32 is such that the bolt element 24 can slide longitudinally in the passageway 17.

An electronic water-activated circuitry package 33 with water-sensing electrodes 34 is integrally mounted between the legs 19 of the female member 12 proximate the connecting bar 18. The electronic circuitry is electrically connected to the explosive squib cartridge 27 by a feed-through element 36, the details of which are shown in FIGS. 5 and 6 (described supra). The upper surface 35 of the electronic circuitry package 33 is convex.

The cap element 13 is an integral frame structure having a concave capping bar 37 and two arms 38 extending perpendicularly upward from the capping bar 37. The capping element 13 is adapted to nest between the extending legs 19 of the female member 12. The arms 38 have holes 41 for receiving a webbing bar 39. The respective ends of the webbing bar each extend beyond the arm holes 41 and are received in a slot 42 drilled through the extending legs 19 of the female member 12. An inert insulative resilient sealing material 43 is disposed on the concave surface of the capping bar 37. The concave surface of the capping bar 37 is held against the convex surface 35 of an electronic circuitry package 33 by two shear pins 44, whereby the sensing electrodes 34 of the circuitry package 33 are insulated and isolated from the external environment.

In operation, a riser strap 46 connected to a parachute canopy is secured around the webbing bar 39. A webbing strap 47, connected to the parachute harness, is secured around the frame 16 of the male member 11. Prior to deployment of the parachute canopy, the cap element 13 isolates electrodes 34 of the electronic circuitry package 33 from the outside environment. Upon deployment of the parachute canopy, the opening shock shears the shear pins 44 and the cap element 13 moves upward relative to the female member exposing the electrodes 34. (See FIGS. 3 and 4). Then, upon immersion of the coupling assembly in water, electrical conduction is established between the sensing electrodes 34, and the circuitry within the electronics package 33 detonates the explosive squib cartridge 27, whereupon expanding gases drive the piston element 28 against the end of the bolt element 24 to move the bolt elements 23 and 24 longitudinally in the "locking passageway" from the locking position (FIG. 1) to the releasing position (FIG. 3), shearing the shear pin 29. The longitudinal translation of the bolt elements 23 and 24 is arrested by the stop 26.

As shown in FIG. 3, when the translation of the bolt elements 23 and 24 is stopped at the releasing position, the bolt element 24 is wholly received within the passageway 17 through the tongue element 14 of the male member 11, and the bolt element 23 is wholly received within the portion of the passageway 21 to the left of the receptacle 22, and the male and female members of the release coupling can separate. (See FIGS. 3 and 4).

The end edges of the bolt elements 23 and 24 are rounded such that if the elements are slightly misaligned when they are stopped in the releasing position (FIG. 3), the shoulders of the tongue element 14 and of the connecting bar 18 adjacent the receptacle 22 tangentially engage the rounded end edges and shove bolt elements 23 and 24 into proper registry as the male and female members disengage. Similarly, the abutting end edge of the piston element 28 is rounded such that if it enters into the passageway 14, the shoulder of the tongue element will push it back into the passageway 21 as the coupling disengages. Accordingly, the bolt elements 23 and 24 do not have to be precisely aligned in the releasing position (FIG. 3) for disengagement of the release.

Since the cap element 13 isolates the sensing electrodes 34 from the environment prior to deployment of the parachute canopy, the possibility of the release operating prior to actual use is virtually eliminated. Furthermore, as shown in FIG. 4, the concave capping bar 37, after it has lifted, shields the electrodes from raindrops and particulate debris to minimize the probability of inadvertent shorting of the electrodes 34 during descent. Finally, the circuitry contained in the circuitry package can be designed to fire the explosive squib 27 only if electrical conduction between the electrodes 34 reaches a threshold magnitude, to further minimize the possibility of premature operation of the release.

When the male and female members 11 and 12 are connected the engaged portions of the release essentially form a solid single element structure. Specifically, the tongue element 14 received in the receptacle 22 in the connecting bar 18 essentially form an integral structure capable of providing substantial resistance to disfiguring stresses. In addition, since the tongue element 14 is in alignment with any stresses tending to separate the male and female members 11 and 12, and the bolt elements 23 and 24 are oriented perpendicularly with respect to those stresses, the probability of a mechanical shock binding the male and female members together is minimal. Accordingly, the release has a very high resistance both to mechanical shock and to disfiguring mechanical loads.

In addition, as should be apparent to those skilled in the art, the two bolt elements need only move a fraction of their respective lengths for disengagement of the release, thereby both substantially reducing the disengagement time and minimizing the energy required for disengagement. Specifically, since the bolt elements are oriented perpendicularly with respect to a tensile force vector across the coupling, the energy required for disengagement is equal to that necessary to shear the shearpin 29 and overcome the friction restraining movement of the bolt elements 22 and 23 in the "locking passageway".

Finally, the alignment of the tongue element 14 with the tensile load vector across the release ensures disengagement of the release upon operation of the decoupling mechanism.

Referring now to FIGS. 5 and 6, the feed-through 36 making the electrical connection between the electronics package 33 and the explosive squib cartridge 27 comprises a structural plate 48 with integral fastening members 49 extending perpendicularly from the plane of the plate. The structural plate 48 is adapted to receive a conductive sandwich 51 having a thin insulative layer 52, a thin conductive layer 53, a thick insulative layer 54, a thin conductive layer 56, and a thin insulative layer 57, which rests against the surface of the plate 48.

A hole is drilled perpendicularly into each end of the sandwich connector 51 for receiving coaxial conductive elements 58 and 59 of the explosive squib cartridge 27 and the coaxial conductive elements 60 and 61 of the coaxial output 62 of the electronics circuitry package 33. The conductive layer 53 of the sandwich makes electrical connection between the outside coaxial conductors 58 and 60 of the explosive squib cartridge 27 and the coaxial output 62, respectively. The conductive layer 56 makes electrical connection between the central conductors 59 and 61 of the explosive squib 27 and coaxial output 62 respectively. The described feed-through 36 fits within a mating receptacle cut into the side of one of the extending legs 19 of the female member and is secured by suitable pins received in holes 64 drilled through the fastening members 49.

While the invented release coupling is described with respect to an exemplary or representative or schematic embodiment, it should be apparent to those skilled in the art that numerous variations and modifications can be effected within the scope and the spirit of the invention as described hereinabove. Moreover, as should be apparent to those skilled in the art, the described release coupling can be adapted for functions other than automatically releasing parachute canopies within the spirit and the scope of the invention as described above and as defined and set forth in the appended claims.

I claim:

1. In a normal coupled release including a male and female member adapted to separate upon detonation of an explosive squib, the improvement in combination therewith comprising two sensing electrodes, and an electrical pulse generating means responsive to electrical conduction between said sensing electrodes, means for conducting an electrical pulse from said pulse generating means to said explosive squib, for detonating said squib, and means for insulating and isolating said sensing electrodes from the external environment preventing electrical current conduction therebetween and said means exposing said sensing electrodes to the external environment responsive to impulse tensile loading tending to separate said male and female members whereby electrical current conduction between said sensing electrodes is possible.

2. A normally coupled release coupling including, a female member having a receptacle therein.

a releasable male member in said receptacle, said members having a common locking passageway through said members, said passageway having first female section on one side of said receptacle, a second female section on the other side of said receptacle, and a male section through the entire width of said male member in said receptacle, a first bolt element initially positioned in said locking passageway with an end portion extending from said male section of said passageway into said first female section of said locking passageway, said first bolt having a length equal to said width of said male member, a second bolt element initially positioned in said locking passageway with an end portion extending from the second female section of said locking passageway into said male section of said locking passageway abutting against the end of said first bolt element within said male section of said locking passageway, said end portions of said first and second bolt elements initially securing said male and female members together in a normally coupled position, and means for preventing accidental translation of said first and second bolt elements from said initial positions holding said male and female elements together in said normally coupled position, and means for translation of said first bolt element from said initial position into registry with the male section of said locking passageway whereby said male member can pull free of said female member, including an explosive squib adapted to be detonated by an electrical current pulse disposed in said first female section of said locking passageway behind said first bolt element for introducing a high pressure gas into said locking passageway upon detonation to translate said bolt elements longitudinally in said locking passageway whereby said male member can pull free of said female member, the improvement in combination therewith comprising, an electrical pulse generating means for detonating said explosive squib including two sensing electrodes, said electrical pulse generating means being adapted to generate an electrical pulse responsive to electrical conduction between said sensing electrodes, and means for conducting an electrical pulse from said pulse generating means to said explosive squib, and means insulating and isolating said sensing electrodes from the external environment preventing electrical current conduction therebetween and said means exposing said sensing electrodes to the external environment responsive to impulse tensile loading tending to separate said male and female members whereby electrical current conduction between said sensing electrodes is possible.

3. The release coupling of claim 2, wherein the receptacle of the female member and the male member have polygonal cross sections.

4. The release coupling of claim 3, wherein the locking passageway defined by the male and female members is oriented perpendicularly with respect to the receptacle of said female member and the male member received in said receptacle.

5. The release coupling of claim 4, wherein the locking passageway and the first and second bolt elements are cylindrical.

6. The release coupling of claim 5, wherein the first and second bolt elements have end surfaces perpendicularly oriented with respect to the longitudinal axis of the elements and a rounded junction between said end surfaces and the longitudinal surfaces of the respective elements.

7. The release coupling of claim 6, wherein the said second bolt element has a length equivalent to the length of said second female section of said locking passageway whereby longitudinal translation of said first bolt element is in registry with said male section of said locking passageway.

8. The release coupling of claim 7 wherein said means for preventing accidental translation of said first and second bolt elements comprise a shear pin securing said second bolt element within said second female section of the locking passageway with an end portion extending therefrom into said male section of the locking passageway, whereby said release coupling is held in a normally coupled position.

9. The release coupling of claim 2 further defined in that said female member includes two integral parallel extending legs having holes defined through their distal ends, said holes being adapted to receive ends of a webbing bar whereby said female member is adapted for connection to a flexible webbing strap, and wherein said male member has an integral webbing frame adapted for connection to a flexible webbing strap.

10. The release coupling of claim 9 further defined in that said electrical pulse generating means is contained in a circuitry package mounted on said female member between said extending legs of said female member.

11. The release coupling of claim 10 further defined in that the distal surface of said circuitry package is convex with said electrodes located at the apex of said convexity.

12. The release coupling of claim 11 wherein said means insulating and isolating said sensing electrodes from said external environment preventing electrical conduction therebetween comprises a rectangular U-shaped frame structure having a concave bottom bar adapted to mate with the convex surface of said circuitry package, and extending arm members being secured to said webbing bar, said rectangular U-shaped frame being received between said extending legs of said female member, a resilient, inert, insulative medium disposed on the concave surface of said bottom bar of said U-shaped frame structure and means for securing said U-shaped frame structure with said concave bottom bar in contact with said convex surface of said circuitry packet, and for releasing said U-shaped frame structure responsive to impulse tensile loading tending to separate said male and female members.

13. The release coupling of claim 12 further defined in that said means for securing said concave bottom bar of said rectangular U-shaped frame in contact with said convex surface of said circuitry packet and for releasing same responsive to said impulse tensile load comprises two shear pins received in holes defined through the extending legs of said female member and the arms of said rectangular U-shaped frame structure.

14. The release coupling of claim 13 wherein said hole at the distal end of said legs of the female member adapted to receive the ends of said webbing bar comprise slots having a longitudinal dimension greater than a diametric dimension of said webbing bar, said longitudinal dimension being aligned with the longitudinal axis of said legs, said webbing bar ends being held in a first position in said slots by said shear pins securing the concave bottom bar of said rectangular U-shaped frame structure in contact with said convex surface of said circuitry package, said webbing bar ends being adapted to move to a second position in said slots responsive to a tensile stress across said coupling sufficient to shear said shear pins, whereby said concave bottom bar of said rectangular U-shaped frame structure is lifted from convex surface of the circuitry package and said sensing electrodes are exposed to the external environment responsive to a tensile stress across said coupling.

15. The release coupling of claim 14 further defined in that said means for making electrical connection between said electrical pulse-generating means and said explosive squib comprise, in combination, a rectangular sandwich conductor having a first insulative layer, a second conductive layer, a third insulative layer, a fourth conductive layer, and a fifth insulative layer, wherein said third insulative layer has a thickness substantially greater than said remaining layers, said rectangular sandwich conductor having two holes defined perpendicularly through its sandwich structure proximate its distal ends, each for receiving a coaxial conductor having a central conductive element and an outer coaxial conductive element separated by insulative materials such that said second conductive layer makes electrical connection between said outer coaxial conductive element of said coaxial conductors and said fourth conductive layer makes electrical connection between said central conductive element of said coaxial conductors.

16. The release coupling of claim 15 further defined in that said electronic circuitry package has a coaxial conductive output extending out a port defined through one of said extending legs of said female member, and in that said explosive squib has a coaxial conductive input extending from said locking passageway parallel to said output of said circuitry package, said extending coaxial output and input of said circuitry package and said explosive squib, respectively, being received in said holes of said rectangular sandwich connector, said sandwich connector being received in a recess cut into a side wall of one of extending legs of said female mamber, and a cover member adapted to be secured to said female member for holding said rectangular sandwich conductor in position in said recess.

* * * * *